P. T. SIEVERT.
PROCESS FOR MANUFACTURING GLASS PLATES.
APPLICATION FILED NOV. 14, 1908.
1,039,829.
Patented Oct. 1, 1912.
4 SHEETS—SHEET 1.
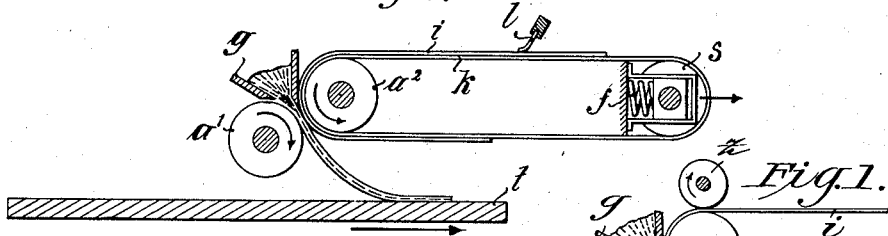
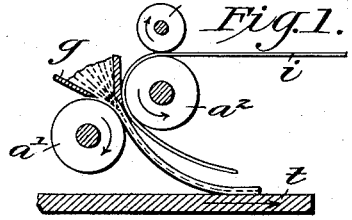
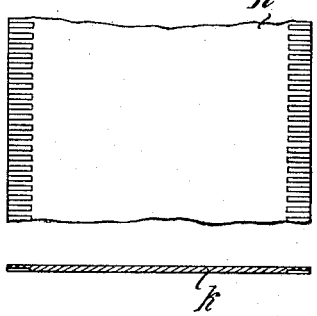
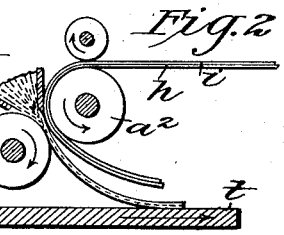
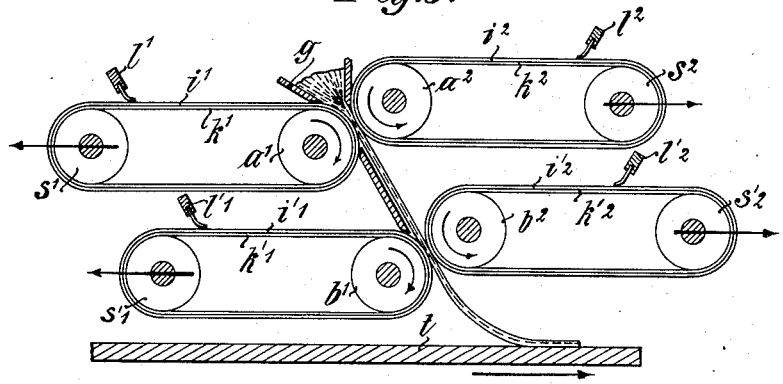
Witnesses:
Inventor:
Paul T. Sievert,
By his Attorney,

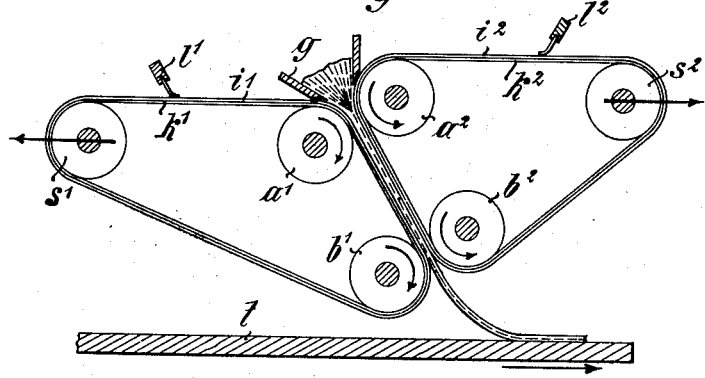
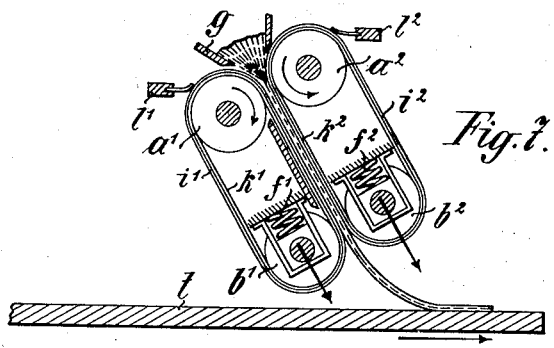
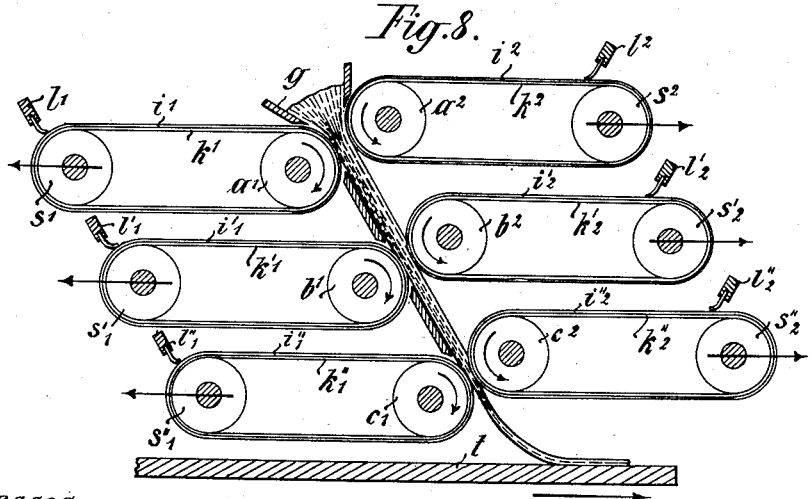

P. T. SIEVERT.
PROCESS FOR MANUFACTURING GLASS PLATES.
APPLICATION FILED NOV. 14, 1908.

1,039,829.

Patented Oct. 1, 1912.

Witnesses:
S. Newman
H. D. Penney

Inventor:
Paul T. Sievert,
By his Attorney,
F. H. Richards

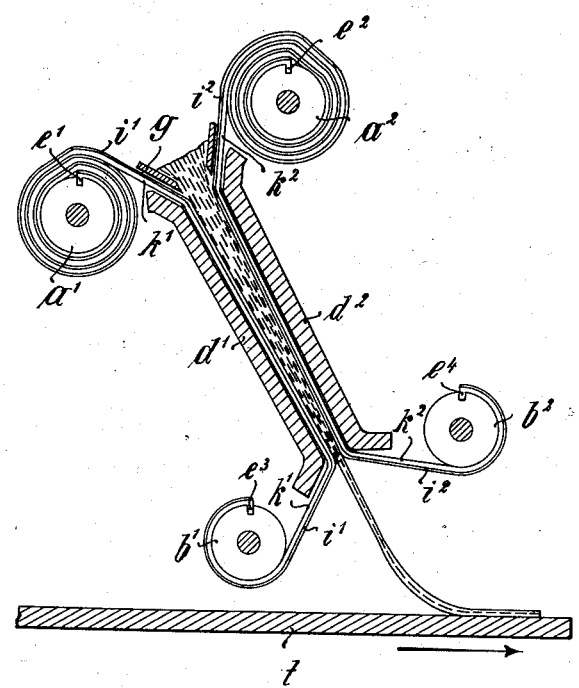

UNITED STATES PATENT OFFICE.

PAUL THEODOR SIEVERT, OF DRESDEN, GERMANY.

PROCESS FOR MANUFACTURING GLASS PLATES.

1,039,829.  Specification of Letters Patent.  Patented Oct. 1, 1912.

Application filed November 14, 1908. Serial No. 462,581.

*To all whom it may concern:*

Be it known that I, PAUL THEODOR SIEVERT, manufacturer, a subject of the Kingdom of Saxony, residing at Winckelmannstrasse 1, Dresden, Kingdom of Saxony, German Empire, have invented certain new and useful Improvements in Processes for Manufacturing Glass Plates, of which the following is a specification.

This present invention provides a reliable process for producing glass plates with a good polish on one or both sides, and with little brittleness, direct between pressure surfaces through which glass is passed; a great want thus being satisfied. To that end, the molten glass is conveyed through a pair of rolls or between two converging plates or the like, and at the same time a layer withdrawing very little heat (an insulating layer) for instance a metal plate or a sheet of paper is passed between the glass and the glass spreading surface of the roll or of the plate, the said insulating layer, in accordance with this invention, being removed from the glass plate formed as quickly as possible, that is to say, at the latest when the still hot plate coming out from the forming device, is deposited on a support. According as the plate is to be highly polished on one or both sides, one or two insulating layers are used. A still better result is obtained according to this process by using insulating layers of fibrous materials which, as is well known, are suitably moistened. The glass plates formed in contact with the most fibrous material surfaces can be obtained direct with a high polish (fire polish). It is advisable to place such moist fibrous material sheets on the metal sheets in order to carry them together through the rolls or the converging plates. Such sheet metal supports protect the fibrous materials, more particularly paper materials, against injury during their use, and at the same time they prevent an excessively quick evaporation of the moisture supplied to the fibrous materials.

In the accompanying drawings are shown forms of apparatus for carrying out the present invention, being vertical sections, in which—

Figure 1 shows a pair of rolls with a single band. Fig. 2 shows the same with a double band. Fig. 3 shows the use of an endless band under tension. Fig. 4 shows a detail of the band. Fig. 5 shows the use of four sets of bands. Fig. 6 shows two bands each supported by three rollers. Fig. 7 shows a pair of inclined bands. Fig. 8 shows three pairs of coöperating bands. Figs. 9 and 10 show other arrangements of the endless band; and Fig. 11 shows a form in which the bands are wound up on the rollers.

Fig. 1 shows how an insulating layer $i$, if desired with a coöperation of a feed drum $z$, is supplied to the surface of a roll $a^2$ of the pair of rolls $a^1$ $a^2$ doing the rolling work. The layer can be a metal sheet, as well as a suitably moistened fibrous material strip. While the rolls $a^1$ $a^2$ are rotating, the rolling table is traveling in the direction of the arrow. At the same time, liquid glass is introduced into the inlet funnel $g$ which can be narrower than the width of the glass plate to be rolled. The roll $a^1$ could be supplied with an insulating layer in the same way as the roll $a^2$.

Fig. 2 shows the same process as Fig. 1, but two layers are used, consisting of a moistened or not moistened fibrous material strip $i$ and of a metal sheet $h$, on which the strip is placed and secured.

Fig. 3 shows the arrangement of the insulating layer or of the metal sheet $k$ forming a portion of the same, in the shape of an endless band, in order to give a better hold and a certain positive movement to the said surface which is maintained stretched by means of a tension drum $s$ and bearing springs $f$. The feed drum $z$ has become unnecessary, and the driving of the band is effected exclusively by friction which can be still further increased as shown in Fig. 4, by fluting the edges of the band. These flutes can be provided on the side facing the glass, and are intended to facilitate the driving of the article rolled, or of the glass plate produced. The back surfaces of the sheets can, however, be also fluted or roughened on the whole bearing surface. The surface of the rolls can be also partly or entirely fluted or roughened, or its edges could be provided with small pins engaging with corresponding holes arranged at the edges of the sheets, in order to facilitate the driving of the endless band by the rolls. The moistening of the fibrous material strips $i$ which can cover either only a portion of the sheet metal band $h$, Fig. 2 or the whole surface $k$ (Figs. 5 to 8), is effected either by hand or by means of a suitable moistening device, for instance by means of a wet strip of felt $l$ or the like.

The process according to this invention can be carried out in two or more stages, a first pair of rolls giving a preliminary rolling to the glass and a second or several further pair of rolls carrying out the further reduction in the thickness of the glass plate. The supply and the carrying through of the insulating layers can be effected in any desired manner. It is, however, preferable to do it in such manner that the insulating layers are formed into an endless band. The said band is preferably made of ample length which it is desired to give to the glass plates, so that in manufacturing one plate each surface element of the insulating layers should come into contact only once, for a fraction of a second with the hot glass surfaces, which is a great advantage in the case of moist fibrous material strips. In that way, the moisture of the fibrous material strips will be never completely evaporated, and, therefore, a burning or carbonizing of the fibrous materials could occur only very rarely. As thin sheets of paper are sufficient and would be chiefly used for the purpose, the use even of one paper cover for manufacturing each glass plate would not be a disadvantage.

The necessary length and width of the endless bands made of sheet metal, which are used direct, or with fibrous materials put on them, can be obtained, if necessary by autogenous welding together of small metal sheets. The ends of the metal sheets can be connected in the same way for the purpose of producing endless bands. For each roll could be provided a separate tension drum by means of which the endless bands would be stretched on the roll and driven by the latter. Several such rolls could, however, be provided with a joint endless band stretched by means of one or several tension drums. The pressure rolls must, however, be arranged adjustably in such manner that the endless bands could be rendered effective as pressure surfaces on the sections or portions situated between the pressure rolls.

Fig. 5 shows a rolling mill with two pairs of rolls $a^1$ $a^2$ and $b^1$ $b^2$ to which are supplied insulating surfaces $i^1$ $k^1$ $i^2$ $k^2$. The corresponding tension or stretching drums are marked $s^1$ $s^2$. The stretching devices are indicated here, as well as in Figs. 6 to 8, by horizontal arrows. In that case, the endless band forms between the rolls a guide in which the glass plate rolled on the first pair of rolls, is conveyed to the other pair of rolls. Such a guide is of great importance when moist insulating surfaces are used, as the glass plates remain plastic for a very long time, and, therefore, are inclined to break and easily sag down. It is, therefore, advisable to use, in the case of moist insulating surfaces, a long path for guiding the glass plates, or, if preferred, a large number of pairs of rolls working together. This insures that the glass plates will come out from the rolling mill sufficiently cold to be conveyed farther on. To that end, it is also possible to combine in series one behind another, several groups of pairs of rolls connected by one and the same endless band. A long guide for the glass plates is more particularly required when very wide and thick glass plates, for instance plate glass, are to be rolled, in order to enable them to be deposited on the receiving table in a sufficiently cold state. When different pairs of rolls are arranged behind each other, it is always advisable, as already stated, to give the rolling surfaces of the bottom rolls a slightly smaller distance than to the upper ones, in order to bring about a repeated seizing of the glass plate by the bottom pairs of rolls. This distance can be a very small one, it is intended merely to prevent the glass plate, sliding downward by gravity, namely on moist fibrous material surfaces; from an excessively quick passing between the bottom pairs of rolls. If it is desired to bring about a considerable reduction in the thickness of the glass plate coming out from the upper pair of rolls, the distance between the rolling surfaces of each following pair of rolls decreases more appreciably downward. In that way, the last pair of rolls determine the desired thickness of the glass plate. Such a reduction of thickness by means of a number of pairs of rolls of different distances, is best obtained by arranging for the rolls, on each side of the glass plate, one joint endless band. The two endless bands form then a wedge shaped slot tapering downward. The length of the endless bands, or the number of the pairs of rolls, depends on the length and thickness of the glass plate to be produced. When glass is poured in between the upper rolls and rolled, there will be first formed in the slot a wedge shaped glass plate tapering downward which, however, on coming out from the rolling mill, will assume the desired uniform thickness. In that process the glass is pressed between the insulating layers to a uniform width. At the top there takes place a sliding of the insulated layer relatively to the glass. This results therefore, in a coöperation of the insulating layers in the formation of the glass plate even at the places where the endless band is to be considered also as a guide for the glass plate. This process can, however, be carried out also by using, instead of the upper movable rolls, stationary converging plates (hereinafter referred to as "slides") over which the driving rolls or the tension drums carry the endless bands. The sliding friction produced in the two latter cases by the wedge shaped preliminary shape of the glass plate, contributes to a large extent to the ironing or to the maintaining of the fire polish, and its action can be compared to that obtained in blowing hollow articles by rotation in wet wooden or cooled iron molds.

Fig. 6 shows the arrangement of only one of the endless bands $i^1$ $k^1$ or $i^2$ $k^2$ surrounding the two rolls $a^1$ $a^2$ and $b^1$ $b^2$ and held stretched by one drum $s^1$ and $s^2$, the portions of the insulating surface situated between the two pairs of rolls guiding the already produced, but still soft, glass plate. More than two pairs of rolls could, however, be also connected by a joint endless band.

Fig. 7 shows that one pair of rolls, for instance $b^1$ $b^2$, could at the same time play the part of the stretching drums.

Fig. 8 shows a rolling mill with three pairs of rolls $a^1$ $a^2$ $b^1$ $b^2$ and $c^1$ $c^2$ to which are supplied three pairs of endless bands $i^1$ $k^1$ $i^2$ $k^2$. The rolls of each of these pairs of rolls, for the purpose of gradual reduction of thickness of the glass plate to the desired extent, have different distances apart and different circumferential speeds.

Figure 9:
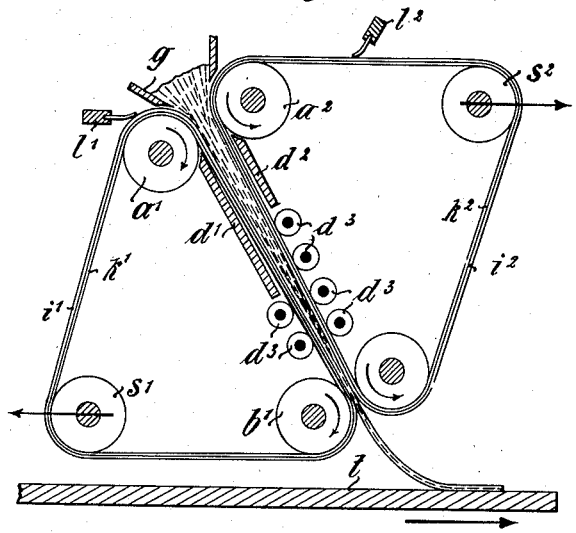

Fig. 9 shows a rolling mill in which the insulating layers $i^1$ $k^1$ and $i^2$ $k^2$ held stretched by the pairs of rolls $a^1$ $a^2$ and $b^1$ $b^2$ and the stretching drums $s^1$ $s^2$, are inclined relatively to each other at a suitable sharp angle, so that the space between them gradually tapers downward. The pressure surfaces $d^1$ $d^2$, or the pressure rollers $d^3$ which rest against the surfaces of the bands opposite the working surfaces, participate in the formation of the glass table as they act in a crushing and thinning manner on the said plate when it is being drawn through. The gradual tapering of the intermediate space has, further, the advantage that in the upper portions of the same the insulating layers have greater speed than the glass and therefore slide relatively to the latter and act on it so as to iron it.

Figure 10:
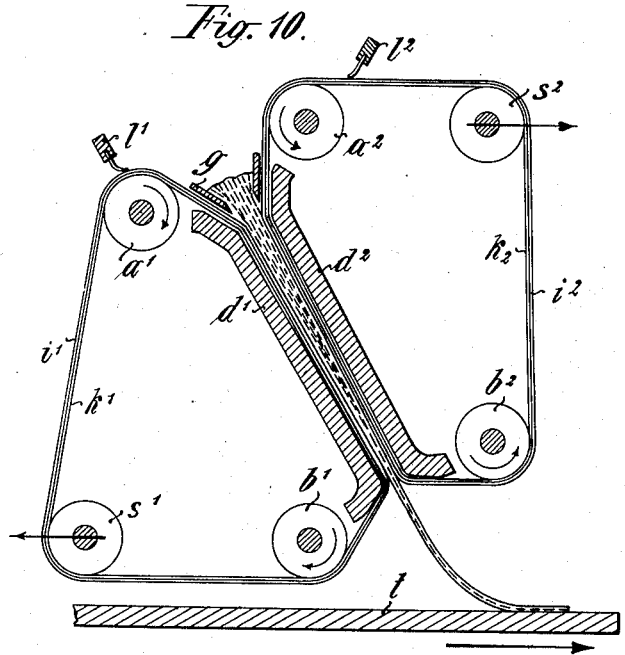

Fig. 10 shows a device in which the upper pressure rolls which otherwise give the first shape, are replaced entirely by other equivalent converging pressure surfaces, $d^1$ $d^2$ which however are stationary. The rolls $a^1$ $a^2$, $b^1$ $b^2$, $s^1$ $s^2$ in this case merely drive or guide and stretch the insulating layers $i^1$ $k^1$ and $i^2$ $k^2$ formed into endless band. If desired, the number of the pairs of rolls and stretching drums can be still further increased.

In certain cases it could happen that the insulating surfaces would slide on the surface of the rolls, and, therefore, would not be conveyed with the necessary uniformity and speed. In order to obtain that drawback, the insulating surfaces, instead of being formed into endless bands, could be formed into bands which are unwound from rolls, and wound on them. For instance, two pairs of rolls can be arranged, to each of which are secured two bands in such manner that when the bottom roll is driven, the bands are unwound from the upper rolls and wound on the bottom ones. During this process, the formation of the glass plates takes place in the manner already explained, provided, of course, that the bands are in the proper position relatively to each other. On the table being finished, the upper rolls are caused to rotate, and in that way the bands are again wound on the same and unwound from the bottom rolls, whereupon a new plate can be produced.

Fig. 11 shows a method of carrying out the process in which the bands are unwound from one roll and wound on another. $a^1$ and $b^1$ and $a^2$ and $b^2$ are two pairs of rolls on which are wound the insulating or ironing bands $i^1$ $k^1$ and $i^2$ $k^2$. The bands travel over pressure surfaces $d^1$ and $d^2$ arranged at a given distance from each other. The bands are secured to the rolls in any desired manner, for instance fixed in the slots $e^1$ $e^2$ and $e^3$ $e^4$. The working is such that, on the glass being poured in, the bottom rolls $b^1$ and $b^2$ are driven, so that the bands $i^1$ $k^1$ and $i^2$ $k^2$ are wound on them, and at the same time unwound to the same extent from the rolls $a^1$ and $a^2$. When the manufacture of a plate is completed, instead of the rolls $b^1$ and $b^2$, the upper rolls $a^1$ and $a^2$ are driven in such direction that the bands $i^1$ $k^1$ and $i^2$ $k^2$ are wound on the same. A new glass plate can then be again produced.

As already described, the bands in this process are wound, during the manufacture of a plate, on the bottom rolls. In that way, the diameter of the said bottom rolls is of course gradually increased. If, during one and the same operation, the rolls make more than one revolution, the distance between the two bands would be gradually decreased. As that is, of course, inadmissible, it would be necessary when the rolls have to make, during one operation, more than one revolution, to choose that method of carrying out the process described, in which the insulating or ironing bands slide on the surface of stationary "slides" which determine the distance apart of the bands. The increase of the diameter of the rolls during the winding of the bands is then of no importance for carrying out the process. As already stated, in one or another of the methods described, the glass surfaces could be provided with insulating layers only on one side, while on the other side they would be brought into contact with rolling surfaces of well known kind. This would be the case when one side is to be provided, by one of the well known processes, with a pattern or a decoration. In the same way, an upper pair of rolls could be run entirely without an insulating layer. This could be more particularly the case in the uppermost pair of rolls on which the glass mass is placed in the first instance. But the first pair of rolls provided with insulating band, must then already produce a perceptible reduction in thickness, in order that the desired ironing effect on the glass surface should be produced. If the glass plate has cooled to a sufficient extent, between the insulating bands, a bottom pair of rolls could also be used without an insulating band. Some of the pairs of rolls working together could, however, be provided with insulating layers of sheet metal, and others with insulating layers of fibrous materials.

Finally, several of the devices illustrated in the drawings can be combined in any desired manner, for instance one or more rolls can coöperate with one and the same "slide". Rolls and rolling tables could also be made, instead of metal, of some other material, for instance wood, fibrous material, stone, etc. The hopper or funnel $g$ shown in the drawing, can be made of any desired material, for instance metal, asbestos, stone, etc. The said hopper could also be replaced by a plate arranged at one side only for pouring in the glass, or it could be done away with altogether where the pressure parts or the insulating layers themselves, form a funnel-shaped inlet. It must be further pointed out that it is well known to convey or carry glass plates by means of rolls made of materials which are a bad conductor of heat, or provided with a coating of such materials, as well as on endless bands in various processes, among others in connection with the rolling process for manufacturing glass plates. In that case, however, during the contact with the endless band, no relative shifting takes place. It is also well known, in rolling glass on a rolling table, to introduce continuously between the roll and the glass, a piece of sheet metal which rests with the surface opposite to the glass in a partly hollow manner on a strengthening band consisting of transverse members. This sheet metal remains, however, on the plate until the said plate is removed from the rolling table, as the said sheet metal is intended to keep the glass down after the rolling into the recesses of the rolling table provided with a pattern. A high polish cannot, therefore, be obtained in that manner.

What I claim as my invention and desire to secure by Letters Patent, is:—

1. A process for producing glass plates which consists in guiding and spreading out a glass mass between pressure surfaces and simultaneously passing insulating layers which absorb little heat between the glass mass and the pressure surfaces, and removing the insulating layers from the glass plate before the latter is deposited.

2. A process for producing glass plates which consists in guiding and spreading out a glass mass between rollers and simultaneously passing insulating layers which absorb little heat between the glass mass and the rollers, and removing the insulating layers from the glass plate before the latter is deposited.

3. A process for producing glass plates which consists in guiding and spreading out a glass mass between converging pressure surfaces and simultaneously passing insulating layers which absorb little heat between the glass mass and the converging surfaces, and removing the insulating layers from the glass plate before the latter is deposited.

4. A process for producing glass plates which consists of guiding and spreading out a glass mass between rollers and simultaneously passing moistened fibrous insulating materials which absorb little heat between the glass mass and the rollers, and removing the insulating material from the glass plate before the latter is deposited.

5. A process for producing glass plates which consists of guiding and spreading out a glass mass between rollers and simultaneously passing sheet metal covered with moistened fibrous material which absorbs little heat between the glass mass and the rollers, and removing the sheet metal covered with moistened fibrous material from the glass plate before the latter is deposited.

6. A process for producing glass plates which consists of guiding and spreading out a glass mass between converging surfaces and simultaneously passing sheet metal covered with moistened fibrous material which absorbs little heat between the glass mass and the converging surfaces, and removing the sheet metal covered with moistened fibrous material from the glass plate before the latter is deposited.

In witness whereof I have hereunto signed my name this 30th day of October 1908 in the presence of two subscribing witnesses.

PAUL THEODOR SIEVERT.

Witnesses:
PAUL ARRAS,
CLÄRE SIMAN.